United States Patent
Marsh et al.

(10) Patent No.: US 12,372,273 B2
(45) Date of Patent: Jul. 29, 2025

(54) NATURAL ENHANCED GEOTHERMAL SYSTEM USING A HOT SEDIMENTARY AQUIFER

(71) Applicant: The Johns Hopkins University, Baltimore, MD (US)

(72) Inventors: Bruce D. Marsh, Hunt Valley, MD (US); Saman Karimi, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 546 days.

(21) Appl. No.: 17/760,453

(22) PCT Filed: Jul. 23, 2020

(86) PCT No.: PCT/US2020/070305
§ 371 (c)(1),
(2) Date: Aug. 10, 2022

(87) PCT Pub. No.: WO2021/167701
PCT Pub. Date: Aug. 26, 2021

(65) Prior Publication Data
US 2023/0098906 A1     Mar. 30, 2023

Related U.S. Application Data

(60) Provisional application No. 62/979,033, filed on Feb. 20, 2020.

(51) Int. Cl.
*F24T 10/20* (2018.01)
*E21B 43/26* (2006.01)
(Continued)

(52) U.S. Cl.
CPC .............. *F24T 10/20* (2018.05); *E21B 43/26* (2013.01); *F03G 4/00* (2021.08); *F03G 7/04* (2013.01); *Y02E 10/10* (2013.01)

(58) Field of Classification Search
CPC . F24T 10/10; F24T 10/20; F24T 10/30; Y02E 10/10; E21B 43/26; E21B 43/27;
(Continued)

(56) References Cited

U.S. PATENT DOCUMENTS

| 4,357,802 A | 11/1982 | Wahl, III et al. |
| 2013/0062890 A1 | 3/2013 | Saar et al. |
| 2015/0354859 A1* | 12/2015 | Marsh ..................... F24T 10/20 |
| | | 165/45 |

FOREIGN PATENT DOCUMENTS

| DE | 102010006141 A1 | 8/2011 |
| EA | 201170019 A1 | 8/2011 |

(Continued)

OTHER PUBLICATIONS

Busby, J., et al., "Assessment of the resource base for engineered geothermal systems in Great Britain," Geothermal Energy, vol. 5(1), 2017, 18 Pages. doi:10.1186/s40517-017-0066-z.
(Continued)

*Primary Examiner* — Loren C Edwards
(74) *Attorney, Agent, or Firm* — Harrity & Harrity, LLP

(57) ABSTRACT

A natural enhanced geothermal system (NAT-EGS) that uses a hot sedimentary aquifer (HSA) is disclosed. An example method may include pumping, via an extraction well, heated water from an extraction depth of a HSA, wherein the HSA satisfies a threshold geothermal characteristic. The example method may include extracting, via an energy conversion unit, heat from the heated water to capture energy, resulting in cooled water. The example method may include injecting, via an injection well, the cooled water at an injection depth of the HSA, wherein the injection depth is deeper than the extraction depth.

20 Claims, 8 Drawing Sheets

(51) Int. Cl.
*F03G 4/00* (2006.01)
*F03G 7/04* (2006.01)

(58) Field of Classification Search
CPC .. E21B 43/30; E21B 43/305; F03G 4/00–074; F03G 7/04; F03G 7/074
See application file for complete search history.

(56) References Cited

FOREIGN PATENT DOCUMENTS

SU          1633237 A1    3/1991
WO       2011092335 A2    8/2011
WO    WO-2018206773 A1 *  11/2018  ............... F03G 7/04

OTHER PUBLICATIONS

Extended European Search Report For European Application No. EP20920477.5, mailed on Apr. 26, 2024, 11 Pages.
Hein, F.J., "Unconventional Energy Resources: 2017 Review," Natural Resources Research, vol. 28(3): 1-91, 2018, 91 Pages. DOI:10.1007/s11053-018-9432-1.
International Search Report and Written Opinion issued in Application No. PCT/US2020/070305; ISA/RU; Dated Oct. 29, 2020, 7 Pages.

* cited by examiner

NATURAL ENHANCED GEOTHERMAL SYSTEM USING A HOT SEDIMENTARY AQUIFER

CROSS-REFERENCE TO RELATED APPLICATION

This Patent Application is a 371 national stage of PCT Application No. PCT/US2020/070305 filed on Jul. 23, 2020, entitled "NATURAL ENHANCED GEOTHERMAL SYSTEM USING A HOT SEDIMENTARY AQUIFER," which claims priority to U.S. Provisional Patent Application No. 62/979,033, filed on Feb. 20, 2020, and entitled "NATURAL ENHANCED GEOTHERMAL SYSTEM USING A HOT SEDIMENTARY AQUIFER." The disclosure of the prior Applications are considered part of and are incorporated by reference into this Patent Application.

BACKGROUND

An increasingly critical problem for the world is access to energy sources to support society. Hydrocarbons are currently the principal source of energy for the world economy. However, the use of hydrocarbons presents two problems: 1) hydrocarbons are a finite non-renewable resource, and 2) hydrocarbons are the major source of carbon dioxide ($CO_2$) production that is driving the heating of Earth's atmosphere. In terms of human energy needs, geothermal energy stands in marked contrast to hydrocarbon-based energy because geothermal energy is a renewable resource that emits no $CO_2$ or other greenhouse gas that would contribute to warming and also has a worldwide distribution. Unfortunately, the lack of an adequate design for a system that can extract sufficient quantities of heat for commercial energy production has limited geothermal energy production to naturally occurring hydrothermal systems and fracturing hot dry rock in volcanic regions, both of which represent only a small fraction of the total worldwide geothermal resources and are poorly distributed relative to energy needs.

SUMMARY

According to some implementations, a method may include pumping, via an extraction well, heated water from an extraction depth of a hot sedimentary aquifer (HSA), wherein the HSA satisfies a threshold geothermal characteristic; extracting, via an energy conversion unit, heat from the heated water to capture energy, resulting in cooled water; and injecting, via an injection well, the cooled water at an injection depth of the HSA, wherein the injection depth is deeper than the extraction depth.

According to some implementations, a method associated with configuring a natural enhanced geothermal system (NAT-EGS) may include identifying an HSA below a surface location; determining that a geothermal characteristic of the HSA satisfies a threshold associated with providing geothermal energy; determining, according to the geothermal characteristic, an extraction depth for an extraction well and an injection depth for an injection well, wherein the extraction well is to extract heated water from the HSA and the injection well is to inject cooled water into the HSA that is generated from a heat extraction process associated with capturing geothermal energy; and providing the extraction depth and the injection depth for a configuration of the NAT-EGS in association with the surface location.

According to some implementations, a NAT-EGS may include an energy capture unit; a pump system; a disjointed well system within a hot sedimentary aquifer (HSA), wherein the disjointed well system includes: an extraction well that enables the pump system to provide heated water at an extraction depth of the HSA to the energy capture unit, and an injection well that enables the pump system to inject cooled water from the energy capture unit into the HSA at an injection depth that is deeper than the extraction depth, wherein a difference between the extraction depth and the injection depth is based on a geothermal characteristic of the HSA; and a regulatory device to: cause the pump system to pump the heated water, from the extraction well, to the energy capture unit; cause the energy capture unit to extract thermal energy from the heated water; and cause the pump system to pump the cooled water from the energy capture unit to the injection well, wherein the cooled water results from the thermal energy being extracted from the heated water.

DETAILED DESCRIPTION

Figure 1:
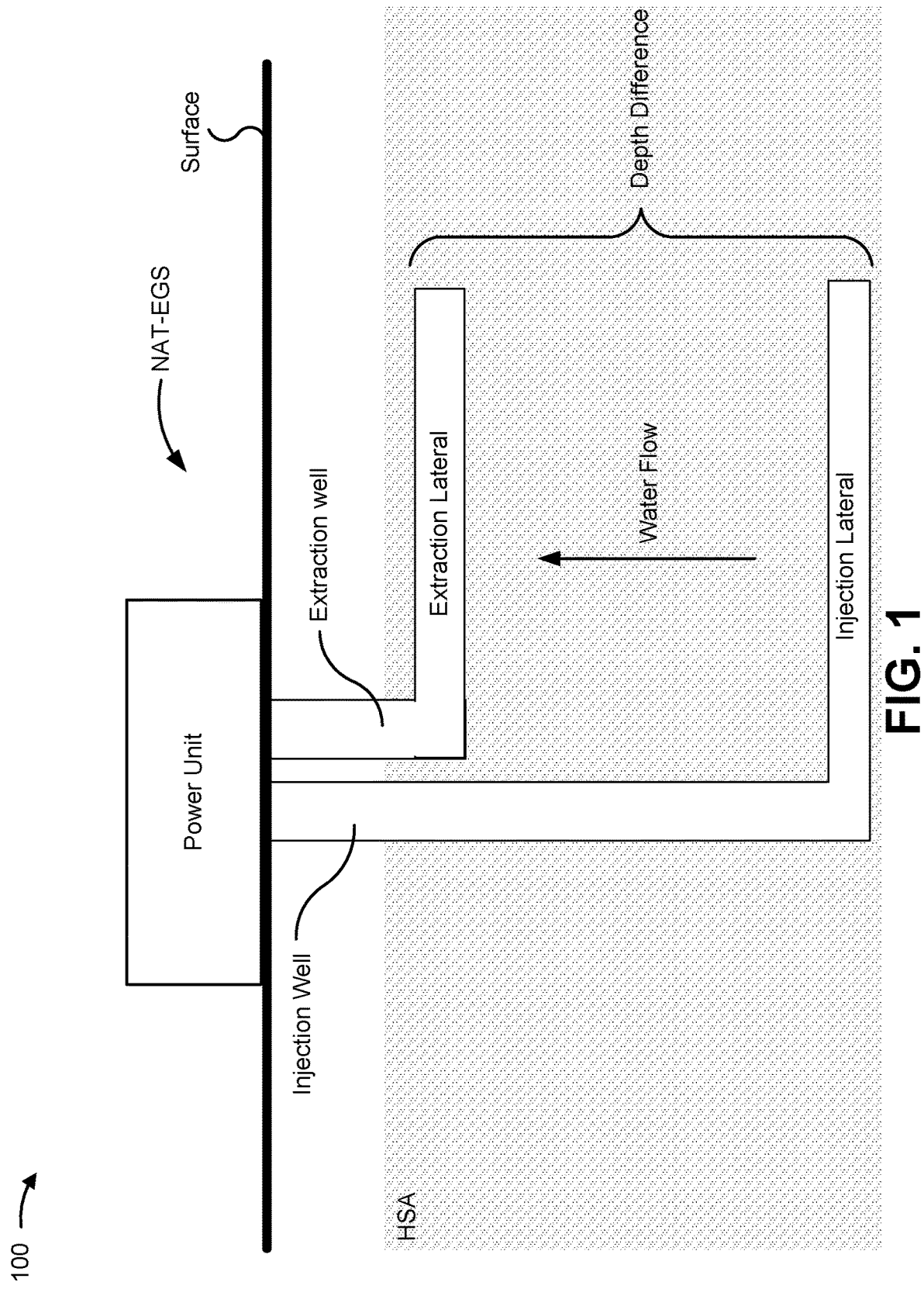
FIGS. 1-4 are diagrams of one or more example implementations described herein.

The following detailed description of example implementations refers to the accompanying drawings. The same reference numbers in different drawings may identify the same or similar elements.

In some instances, geothermal energy may be used for power generation, heat generation, and/or the like. Extraction of geothermal energy from non-seismically active locations (e.g., locations that do not have active hot springs) can involve a plurality of challenges and/or be relatively complex. For example, some geothermal systems can involve generating artificial hydrothermal reservoirs, which may be known as an enhanced geothermal systems (EGS). Such an EGS can be built within hot dry rock (HDR) that is commonly found at sufficient depth within the Earth, as opposed to volcanic emanations, like geysers, which are relatively rare around the Earth and somewhat dangerous depending on the level of volcanic activity associated with those regions of the Earth. Furthermore, creating such a HDR EGS generally involves drilling one or more wells into a manmade reservoir created through fracturing (or fracking). Such a process, which may include hydraulic fracturing, can be relatively complex and/or costly, with regard to requiring relatively large quantities of resources and/or various types of resources (e.g., hardware resources, environmental resources, computing resources, and/or the like).

Further, such a manmade (or manufactured) reservoir of such an EGS can consist of an extensive plexus of fractures through which water travels more or less horizontally and/or randomly and without obstruction. For example, an open, unimpeded passageway is manufactured to enable the water to flow, with minimal or zero impedance (e.g., other than impedances caused by usage, corrosion, natural pressure and/or gravitational forces), from an injection well to a production well. In such an EGS energy is extracted purely from conduction of heat from the HDR, due to the HDR warming the water flowing through the fractures and/or the wells. The efficiency of such an EGS, however, is generally severely limited due to low thermal diffusivity of the HDR, which causes a relatively slow flow of heat to replenish the harvested heat, and, after a relatively short time (perhaps 5 to 10 years) the temperature of water in the production well drops below a level that can adequately provide usable geothermal energy.

According to some implementations described herein, a natural enhanced geothermal system (NAT-EGS) is provided that utilizes a hot sedimentary aquifer (HSA). In a NAT-EGS, as described herein, an injection well and an extraction well may be vertically disjointed in that the injection well is at a depth that is below the extraction well. More specifically, water (e.g., liquid water, vaporized water, or any other type of water-based fluid) is to be extracted from the HSA, via an extraction well at an extraction depth of an HSA. The water is processed to capture heat from the heated water, resulting in cooled water. The cooled water is injected via the injection well at the injection depth of the HSA that is beneath the extraction depth (e.g., to resupply or recharge the HSA with water, force or enable a flow of the water to cause or facilitate more heated water to be extracted via the extraction well, and/or the like). Moreover, a natural upward flow of interstitial HSA waters can be induced via pumping to cause extraction at the top and reinjection at the base. More specifically, this pumping can generate a vertical pressure gradient that induces an upward flow of the HSA waters. Correspondingly, relative to previous EGS systems, the NAT-EGS is relatively simplified because the NAT-EGS does not involve any hydraulic fracturing of the igneous or metamorphic Earth material (e.g., through the HSA or through the HDR, as done in previous techniques) to form the NAT-EGS.

According to some implementations, the HSA is a targeted geothermal reservoir that is relatively hot and relatively large scale. For example, terrain throughout the Earth may be geologically analyzed to identify an HSA that has one or more threshold characteristics that will provide a desired amount of heat. Furthermore, such threshold characteristics may be considered for purposes of efficiency regarding a useful life of the NAT-EGS. According to some implementations, a permeability of an HSA (e.g., that has characteristics that satisfy the one or more threshold characteristics) can be enhanced (e.g., using a combustible material, such as a fuel, a rocket propellant, an explosive (e.g., dynamite), using water pressure, using acidized water, and/or the like) to improve an ability of water to flow through the HSA. Using the methods and systems described herein, geothermal energy can be extracted for relatively longer periods of time (e.g., 50 years or more, depending on the geothermal characteristics of the HSA).

Moreover, although HDR is common all over the Earth it is generally difficult to access and work with due to its highly heterogeneous nature, whereas there are relatively more locations with acceptable HSAs (e.g., surface locations above HSAs) that can be utilized in connection with a NAT-EGS, as described herein. Accordingly, more NAT-EGSs can be distributed throughout the Earth, further reducing the consumption of resources (e.g., hardware resources, design resources, computing resources, and/or the like) using previous techniques and/or emissions from using hydrocarbons as a source of energy.

FIG. 1 is a diagram of an example implementation 100 described herein. As shown in FIG. 1, a power unit (e.g., a power plant or other type of geothermal energy processing facility) associated with a NAT-EGS is positioned on a surface of a location (which may be referred to herein as a "surface location") that is above, over, or near an HSA. The NAT-EGS includes an extraction well with an extraction lateral and an injection well with an injection lateral that have been drilled to various depths of an HSA.

As described herein, the power unit may include a pump system, an energy capture unit, an energy conversion unit (e.g., to convert geothermal energy to mechanical energy, electrical energy, and/or the like), and a regulatory device to control the NAT-EGS. For example, the regulatory device may control an extraction pump of the pump system to extract water from the HSA via the extraction well, control the energy capture unit and/or energy conversion unit to capture and process geothermal energy from the heated water, resulting in cooled water, and control the injection pump to inject the cooled water from the energy capture unit into the HSA via the injection well. Accordingly, the power unit may be configured based on a determined optimum range of water injection rate in the injection well and/or water extraction rate of the extraction well that can produce commercial level of energy or power. Further, the flow rate, of the water can be tuned (e.g., over time, if necessary) via pumping adjustments to achieve a best possible efficiency for the system according to the conditions of the HSA.

Regarding the terrain of the NAT-EGS of example implementation 100, the surface may correspond to a ground (or soil) surface, a water surface (such as a lake surface, ocean surface, and/or the like), or any other suitable type of surface of the Earth. The HSA, in example implementation 100, is beneath the surface and/or the power unit and may include any suitable type of wet sedimentary rock. The HSA may be configured above and/or between one or more layers of igneous rock. Generally speaking, HSAs located in shallower regions or with lower background heat fluxes are not able to produce an adequate amount of geothermal energy for generating power for an area, although some of these regions may produce water hot enough for direct use for heating. Accordingly, for certain applications, the HSA of a NAT-EGS, as described herein, is at least 200 meters (m) thick and/or at least 1000 m below the surface.

As described herein, the surface location may be selected for the power unit based on one or more geothermal characteristics of the HSA. For example, the surface location may be selected based on determining that the HSA is at a suitable, manageable, and/or accessible depth and includes a sufficient volume of water at a sufficiently high temperature, to determine whether the HSA can efficiently be used to capture geothermal energy from the Earth. The HSA (and/or geothermal characteristics of the HSA) may initially be identified and/or analyzed from drilling and sampling the terrain beneath the surface location. Additionally, or alternatively, the HSA may be identified and/or analyzed from seismic imaging data (e.g., mapping data, imaging data, and/or the like) associated with the terrain beneath the surface location. The seismic imaging data may be obtained and/or captured in real-time and/or may correspond to historical data associated with previous seismic imaging and/or previously created well bores associated with previous operations, analyses, and/or geological mappings of the terrain beneath the surface location. As described herein, the geothermal characteristic of the HSA may correspond to one or more characteristics of the HSA that would enable a desired amount of geothermal energy to be extracted from the Earth at a particular rate, for a particular period of time, and/or the like. Such geothermal characteristics may be based on certain physical characteristics of the HSA (e.g., depth, thickness, temperature of the HSA (or water within the HSA), and/or the like).

In some implementations, one of the geothermal characteristics of the HSA that may be considered when selecting the surface location for the power unit, may include a measured or determined heat flow between various depths of the HSA. The heat flow may indicate and/or represent an amount of heat or geothermal energy that can be captured from the HSA during a particular time period. The heat flow may be based on the depths (e.g., uppermost, lowermost, and/or the like) of the HSA (e.g., due to heated core of the earth), the temperature of the water at various depths of the HSA (which may depend on various factors, such as the terrain (or type of material) of the HSA), and/or the like. Accordingly, the heat flow can be determined (and/or estimated) based on certain characteristics and/or measurements associated with the HSA.

Another geothermal characteristic may include a permeability of the HSA. The permeability of the HSA may indicate an amount of water that can be extracted from the HSA within a particular time period and/or a corresponding flow rate of extracting water. Correspondingly, in combination with temperatures of the HSAs (e.g., at various depths of the HSA), the amount of heat or geothermal energy that can be extracted from the HSA can be determined. The permeability of the HSA may be determined based on various standard pumping tests conducted in the associated drill holes into the HSA, the terrain of the HSA, and/or the like. According to some implementations, a construction lateral can be drilled between the injection lateral and the extraction lateral to perform an operation to improve the permeability of the HSA. For example, such a construction lateral may be drilled and configured to receive a fuel (e.g., a liquid or solid fuel that gets ignited), acidic water, and/or pressurized water to separate material of the HSA, thereby improving the permeability between the injection lateral and the extraction lateral. In such cases, the permeability of the HSA may satisfy a permeability threshold associated with permitting the construction lateral to be drilled. Such a threshold permeability may be greater than a permeability threshold to use an HSA without performing enhancement operation to increase the permeability of the HSA to configure a NAT-EGS, as described herein.

Similar to permeability, the geothermal characteristic may include or be associated with a porosity of the HSA, which can indicate of the volume of water held by the HSA. The porosity may indicate or be used to identify the permeability and/or enable a determination of a flow rate of water through the HSA, an amount of water that can be received within the HSA after being processed by the power unit (e.g., to determine an injection rate of a flow of water via the injection well).

Such geothermal characteristics may be compared against corresponding thresholds of the geothermal characteristics to determine whether the HSA is suitable for capturing a desired amount of geothermal energy (e.g., corresponding to enough energy to permit the power unit to output a desired amount of power for an area or region of the surface location) for a desired period of time (e.g., over 50 years). Accordingly, the thresholds may include a minimum heat flow rate into the HSA, a minimum permeability of the HSA, a minimum porosity of the HSA, and/or the like. Additionally, or alternatively, certain physical characteristics of the HSA associated with geothermal characteristics of the HSA may be considered (e.g., a minimum or maximum depth of the HSA, a minimum or maximum thickness of the HSA, a minimum temperature of the HSA, and/or the like).

Accordingly, in contrast to previous techniques, the NAT-EGS may utilize an HSA that has a sufficiently high background basal heat flux and is sufficiently large enough (e.g., has a sufficient volume, thickness, and/or the like) to supply geothermal energy for fifty years or more. As an example, to achieve such an efficiency, the temperature of the water at an extraction depth of the HSA (and/or within the extraction well) may be at least 120 degrees Celsius (° C.), which may be provided by a minimum background basal heat flux (e.g., from below the extraction depth) of 150 milliwatts per square meter ($mW/m^2$). In some locations of the Earth, such an injection depth of the HSA may be at a minimum of 1500 m below the surface, and/or such an extraction depth of the HSA may be at a minimum of 1000 m. In such an example, any recirculated water that was injected via the injection well and is extracted via the extraction well reaches the threshold temperature of at least 120° C. For higher levels of basal heat flux, the minimum depth becomes correspondingly less.

According to some implementations, as described herein, after the surface location is selected for the power unit, the NAT-EGS may be configured and/or designed according to the characteristics of the HSA. For example, as shown, the injection well and the extraction well are a disjointed well system in that heated water is to be extracted from the HSA at an extraction depth and cooled water (which is created from capturing heat from the heated water) is to be injected at an injection depth of the HSA. Accordingly, based on the geothermal characteristics of the HSA and the desired amount of geothermal energy that is to be captured from the HSA, the extraction depth and injection depth (and, correspondingly, the difference between the extraction depth and the injection depth) can be determined to provide a desired water flow rate, energy extraction rate, and/or the like, for a desired period of time that the power unit is to be operable to provide power.

In some implementations, the cooled water can be supplied with a supplemental fluid (e.g., a solvent or solute, such as a muriatic acid, hydrochloric acid, and/or the like) to facilitate flow of available water through the HSA. For example, the supplemental fluid, when injected into the HSA via the injection well (along with the cooled water) can increase permeability and/or porosity of the HSA (by causing erosion or breakdown of some of the rock or material of the HSA). In this way, the NAT-EGS, using the supplemental fluid, can improve geothermal energy extraction via the HSA.

Accordingly, geothermal energy can be obtained, by the power unit and from the HSA, by pumping heated water from the HSA via the extraction well, extracting heat from the heated water to capture energy, resulting in cooled water, and injecting the cooled water back into the HSA via the injection well.

As indicated above, FIG. 1 is provided merely as one or more examples. Other examples may differ from what is described with regard to FIG. 1.

Figure 2:
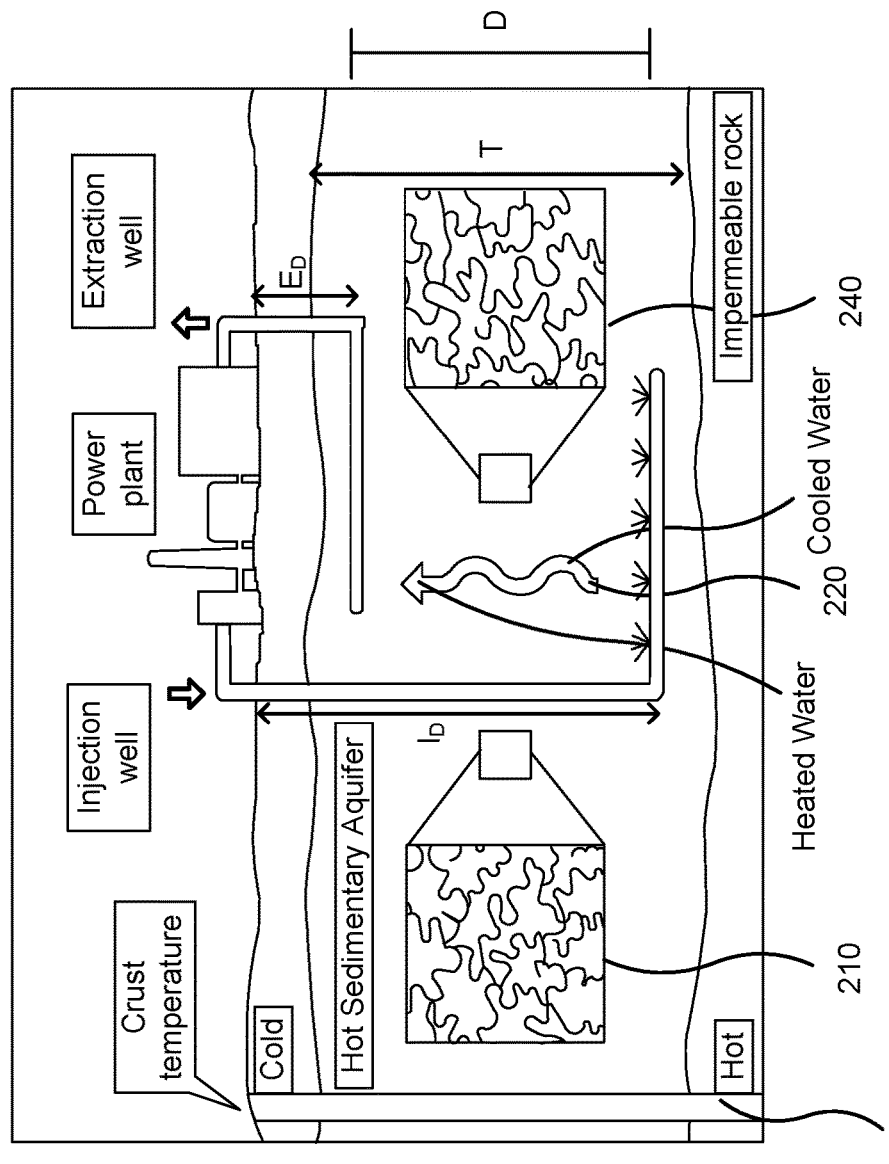

FIG. 2 is a diagram of an example implementation 200 described herein. In example implementation 200, a NAT-EGS (e.g., corresponding to the NAT-EGS of FIG. 1) is illustrated in connection with an HSA having a thickness "T." The NAT-EGS includes an extraction well drilled to a depth $E_D$ (referred to herein as "extraction depth") and an injection well drilled to a depth ID (referred to herein as "injection depth"). The difference "D" may be determined according to the geothermal characteristics of the HSA and may be on the order of 250 m or more, as described herein.

As shown by magnified view 210 in FIG. 2, the HSA may include a plurality of channels that permit water within the HSA to flow through the HSA from the injection well to the extraction well, as shown by reference arrow 220.

In contrast to previous techniques, the configuration of the injection well and the extraction well (which may be referred to collectively herein as "the wells") of the NAT-EGS are disjointed in that the wells are drilled to different depths without creating any manmade fractures or openings directly connecting the wells (e.g., between an extraction lateral of the extraction well and an injection lateral of the injection well) (e.g., because the terrain between the injection well and extraction well includes an HSA with sufficient permeability) that would create an uninhibited upward flow of water between the wells. In example implementation 200, the wells are both L-shaped in that the injection well and the extraction well each have vertical elements and horizontal elements (laterals). For example, the extraction well may have a production element (e.g., which may include a vertical pipe) that extends between the extraction depth and the surface (and/or a power plant on a surface above the HSA) and an extraction lateral that is laterally drilled at the extraction depth. The extraction lateral (e.g., which may include a horizontal perforated pipe) may be mechanically coupled to (e.g., physically attached to, physically fastened to, fluidly coupled, and/or the like) the production element. Accordingly, the extraction lateral may laterally branch out from the production element at the extraction depth. Furthermore, the injection well may have an injection element that extends between the injection depth and the surface and an injection lateral. The injection lateral may be mechanically coupled to the injection element, and laterally branch out from the injection element at the injection depth.

As shown, the extraction lateral and the injection lateral are parallel to one another (e.g., within an industry standard threshold of parallel). Furthermore, the extraction lateral and the injection lateral may be vertically aligned (or within an industry standard threshold of vertical). Accordingly, a vertical heat zone aligned with the induced natural upward flow of hot water (e.g., associated with the area of the reference arrow 220) can be formed within the HSA between the extraction lateral and the injection lateral.

During operation, the injection well is used to release a certain amount of cooled water at the injection depth in a deeper region of the HSA, and the extraction well is used to harvest heated water in a shallower region of the HSA. Accordingly, as indicated by hot/cold scale 230 and the shading of channels shown in magnified view 240 of the HSA, the temperature of the water between in the injection well and the extraction well in example implementation 200 is cooler toward the injection well and warmer toward the extraction well due to the configuration of the NAT-EGS and geothermal characteristics of the HSA. Correspondingly, as illustrated by the shading of the reference arrow 220, the water between the HSA is heated as the water permeates or flows upward from the injection depth to the extraction depth.

Using the NAT-EGS of example implementation 200, water can be cycled through the HSA. For example, injected cooled water in the bottom of the HSA can be exposed to heated material (e.g., sand, rocks, and/or the like) and heated water within the HSA. More specifically, as the cooled water traverses or is infused within the HSA, the cooled water is warmed via conduction and advection or any combination of each. As heated water is pumped from the extraction well, water from deeper in the HSA permeates upward to replace the extracted water. As the energy or heat is harvested from the extracted water, which is now cool, the cooled water is then reinjected into deeper into the HSA via the injection well. That cooled water can again be heated and migrates upward, mingling with other waters eventually to be harvested throughout one or more cycles. By this means, a large-scale convective or circulation system can be established within the greater surrounding HSA environment between the extraction well, the power plant, the injection well, and the HSA. In previous techniques, the heat is supplied mainly by pure thermal conduction, whereas in the heat from the NAT-EGS heat is provided mainly by widespread, natural advection or convection of super-heated water in the deep sedimentary aquifer over a vast volume of HSA material surrounding the specific Drill Holes. Accordingly, relative to previous techniques, a longer (e.g., greater than 50 years) and more continuous production of energy can be maintained without the potential of environmental hazard (e.g., from fracking techniques).

The NAT-EGS may have a longer useful life (e.g., over fifty years or more) because the characteristics of the HSA (many of which are located throughout the Earth) prevent the cooled water from the injection well from relatively quickly cooling the regional sedimentary rock, thereby removing the geothermal energy source. Under previous techniques, such cooling of the heat source (e.g., the HDR) can occur within ten years. Further, the NAT-EGS may be relatively maintenance free during the extended duration and useful life of the NAT-EGS because the heat source (the HSA) does not have to be maintained (while certain fractures of HDR may need to be cleared of debris and/or reopened to maintain a desired flow if the fractures collapse). Moreover, within the source volume of the HSA vertically between the drill holes there are no pipes or artificial or manufactured pathways that may need maintenance.

Accordingly, a NAT-EGS, as described herein, can provide a large-scale recharge of the HSA via circulatory movement of water and heat through the HSA that is induced by the pressure field and temperature gradient associated with pumping water from the extraction well and back into the HSA via the injection well. For example, water from areas that are not within regions surrounding the wells can be pulled into the heat zone between the wells via the circulatory movement. Thus, water in regions of the HSA around the wells can continuously and naturally be reheated by the higher temperature of sedimentary rocks throughout the HSA. Furthermore, a combined effect of heated, low density water being extracted from a shallower region of the HSA, and cooled denser water, having been run through the power plant, being injected into the base of the system functions, in effect, as a thermal flywheel to sustain the circulation.

As indicated above, FIG. 2 is provided merely as one or more examples. Other examples may differ from what is described with regard to FIG. 2.

Figure 3:
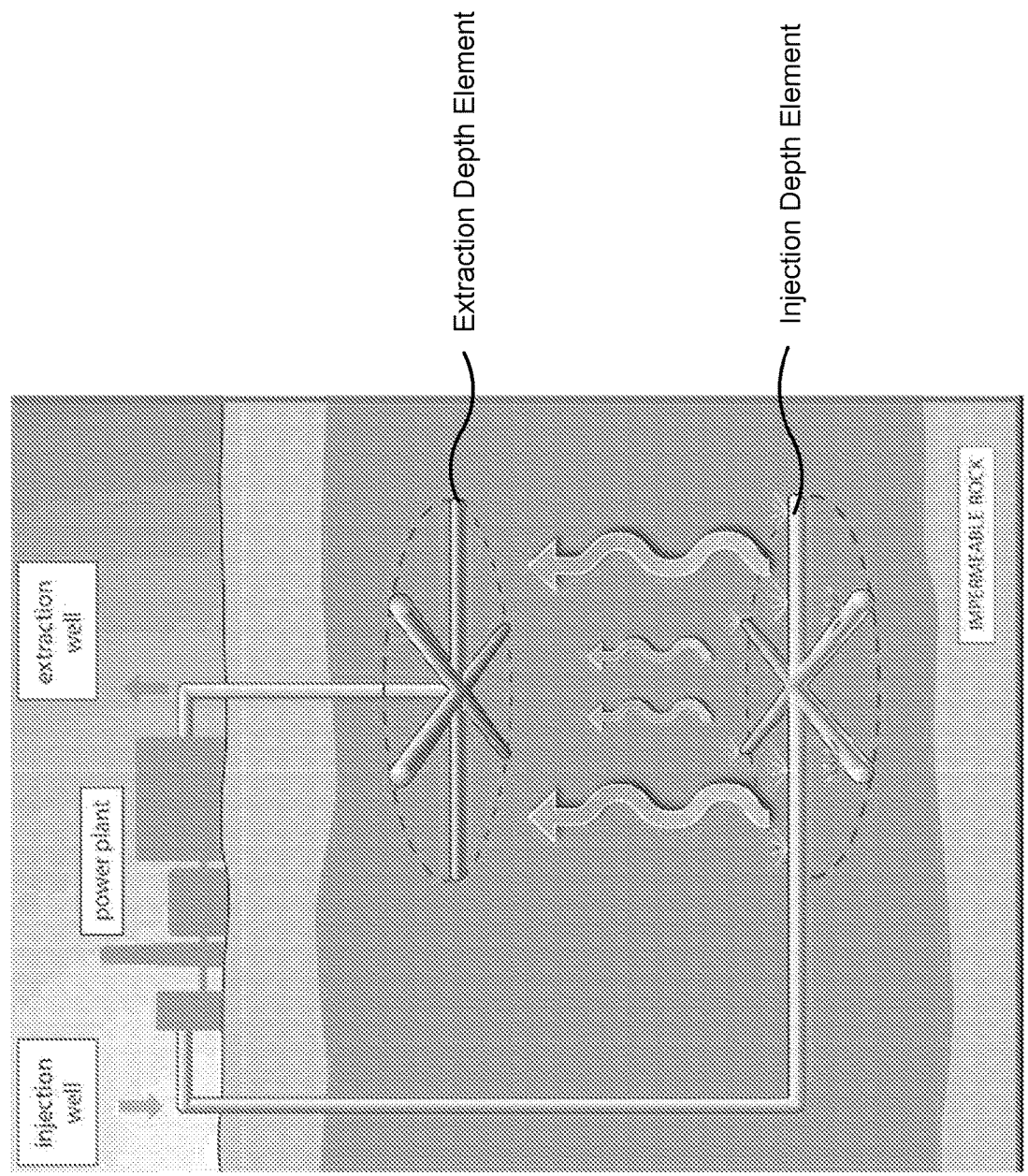

FIG. 3 is a diagram of an example implementation 300 described herein. Example implementation 300 includes a NAT-EGS (e.g., corresponding to the NAT-EGS of FIG. 1 and/or the NAT-EGS of FIG. 2) with an injection well and an extraction well that includes a plurality of lateral branches. The NAT-EGS of example implementation 300 may provide a relatively more complex configuration of the injection well and extraction well to improve heat flow and/or enable extraction of relatively higher quantities of geothermal energy when compared with the NAT-EGS of FIG. 2. For example, the NAT-EGS of FIG. 3 may improve a circulation of fluid and heat in the HSA, thereby increasing the extraction of geothermal energy.

In example implementation 300, each of the wells has several lateral elements (e.g., shown as radially extending components of the injection well). More specifically, the injection lateral may include a plurality of lateral injection branches, and the extraction lateral may include a plurality of lateral extraction branches. Such a configuration, with multiple lateral elements, may enhance the injection of cooled water and/or production and extraction of heated water.

An extraction plane may be formed by the lateral injection branches of the extraction lateral, and an injection plane of the injection lateral may be formed by the lateral injection branches of the extraction lateral. The extraction plane and the injection plane may be parallel to equally distribute water flow between the injection lateral and the extraction lateral. In some implementations, each of the plurality of lateral injection branches may be correspondingly aligned with one of the plurality of lateral production branches to form a plurality of vertical heat flow zones (four of which are represented by the shaded reference arrows between corresponding pairs of lateral elements of the wells) within the HSA and between the injection lateral and the extraction lateral.

According to some implementations, the configuration of the NAT-EGS of FIG. 3 is determined and/or configured according to the geothermal characteristics of the HSA. For example, the HSA of FIG. 3 may have relatively less background/basal heat flux, permeability, and/or porosity than the HSA of FIG. 2. Accordingly, the plurality of lateral elements in the HSA of FIG. 3 may be included within the wells to increase the heat extraction capabilities of the NAT-EGS by accessing alternative pathways for the heated waters to move upward.

As indicated above, FIG. 3 is provided merely as one or more examples. Other examples may differ from what is described with regard to FIG. 3.

Figure 4:
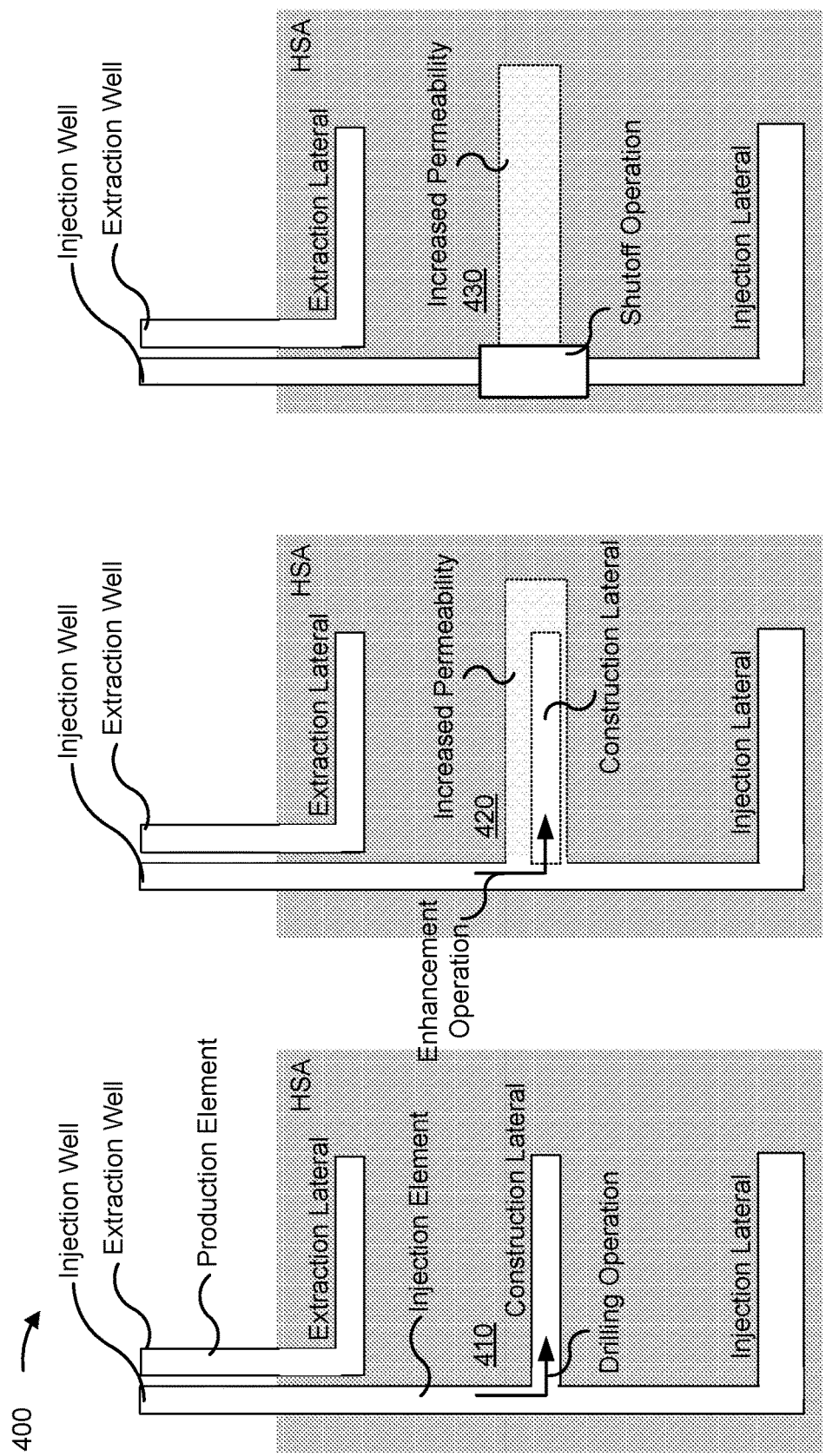

FIG. 4 is a diagram of an example implementation 400 described herein. Example implementation 400 involves construction or production of a NAT-EGS (e.g., corresponding to the NAT-EGS of FIG. 1, the NAT-EGS of FIG. 2, and/or the NAT-EGS of FIG. 3) with an injection well and an extraction well, as described herein. As shown in FIG. 4, the injection well includes an injection lateral and the extraction well includes an extraction lateral.

As shown in FIG. 4, and by reference number 410, a drilling operation is performed to create a construction lateral in the HSA between the injection lateral and the extraction lateral. The construction lateral may be drilled off of (or from) the injection element of the injection well (e.g., so that a separate construction element or vertical does not need to be drilled for the construction lateral). As described herein, the construction lateral may be formed to increase a permeability of the HSA. In some implementations, the construction lateral may have one or more dimensions (e.g., a length or diameter) that are smaller than the injection lateral and/or the extraction lateral. Although shown as being formed after the injection well, the construction well may be formed before, or contemporaneously with, the injection well, in other examples.

As further shown in FIG. 4, and by reference number 420, an enhancement operation is performed in association with the construction lateral. For example, during the enhancement operation, the construction lateral may receive a rocket propellant, which can be ignited to create vertical zones in the HSA to increase the permeability between the injection lateral and the extraction well. Additionally, or alternatively, the enhancement operation may include injecting acidic water and/or pressurized water to increase the permeability of the HSA between the injection lateral and the extraction lateral. In this way, the permeability of the HSA between the injection lateral and the extraction lateral can be enhanced (e.g., within a region of the construction lateral that may be defined by certain parameters of the enhancement operation, such as type or variables associated with the enhancement operation).

As further shown in FIG. 4, and by reference number 430, a shutoff operation is performed to isolate the construction lateral from the injection well. For example, the shutoff operation may include inserting a casing around the injection element where the construction lateral was drilled from the injection element. Accordingly, the construction lateral may not receive water that is to be pumped to the injection lateral. Furthermore, the construction lateral may not be surrounded by or include a casing, thereby enabling material of the HSA to back into a void in the HSA (e.g., the space formed by drilling the construction lateral).

The construction lateral of example implementation 400 may be one of a plurality of construction laterals that are drilled between the injection lateral and the extraction lateral (e.g., during construction or over a useful life of the NAT-EGS). For example, during construction, multiple construction laterals may be created and/or utilized to enhance the permeability of the HSA, as described herein. Additionally, or alternatively, periodically, over the course of usage of the NAT-EGS (and/or based on real-time monitoring of the permeability of the NAT-EGS using seismic imaging and/or the like), the permeability of the HSA may be enhanced at various depths between the injection lateral and the extraction lateral. In this way, the lifespan of the HSA can be extended in the event that the permeability of the HSA reaches a threshold that is below a threshold permeability required to permit a desired water flow and/or heat flow from the HSA.

As indicated above, FIG. 4 is provided merely as one or more examples. Other examples may differ from what is described with regard to FIG. 4.

Figure 5:
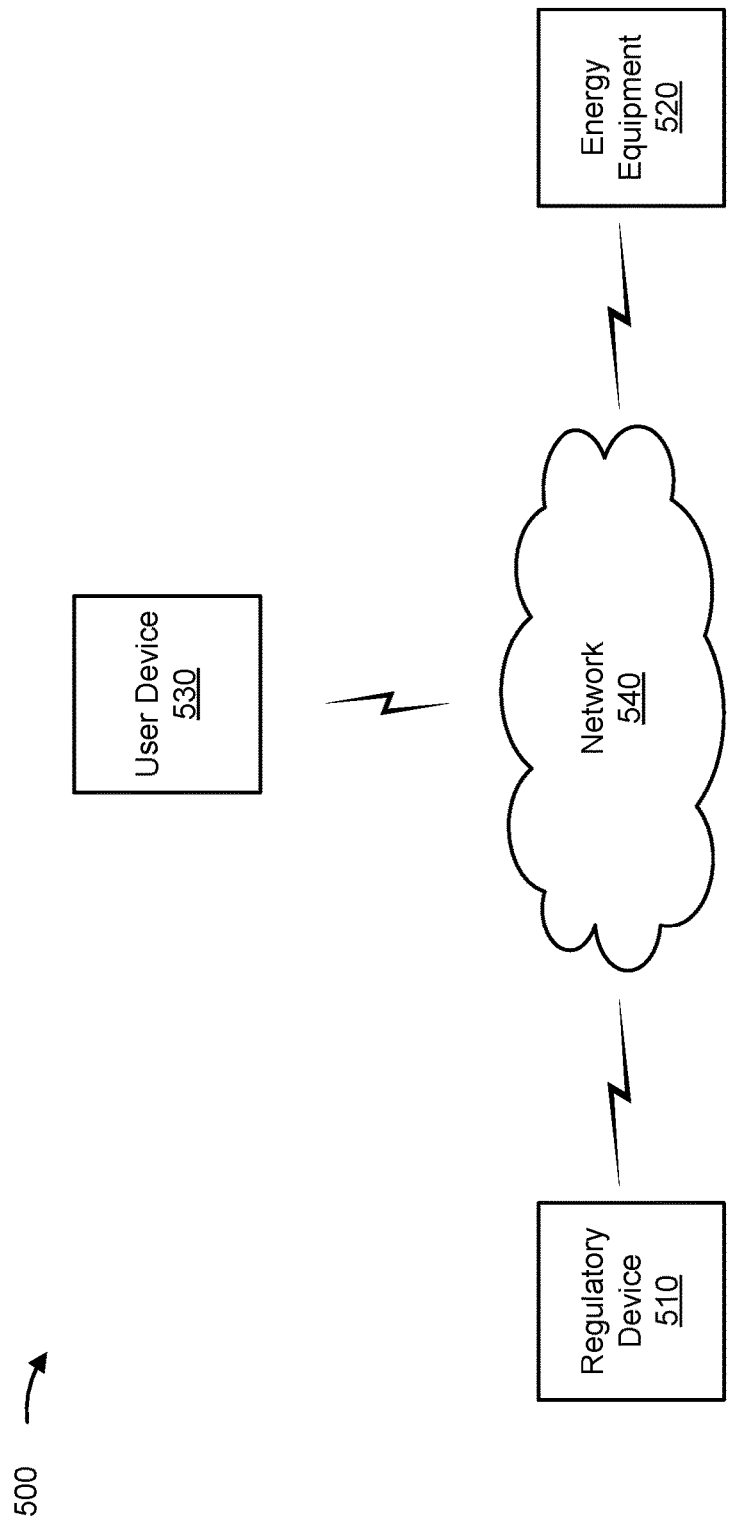
FIG. 5 is a diagram of an example environment in which systems and/or methods described herein may be implemented.

FIG. 5 is a diagram of an example environment 500 in which systems and/or methods, described herein, may be implemented. As shown in FIG. 5, environment 500 may include regulatory device 510, energy equipment 520, a user device 530, a network 540, and/or the like. Devices of environment 500 may interconnect via wired connections, wireless connections, or a combination of wired and wireless connections.

Regulatory device 510 includes one or more devices capable of receiving, generating, storing, processing, and/or providing information associated with controlling manufacture of and/or energy extraction from a radiator enhanced geothermal system. For example, regulatory device 510 may include a communication and/or computing device, such as a mobile phone (e.g., a smart phone, a radiotelephone, etc.), a computer (e.g., a laptop computer, a tablet computer, a handheld computer, a desktop computer), a wearable communication device (e.g., a smart wristwatch, a pair of smart eyeglasses, etc.), or a similar type of device. In some aspects, regulatory device 510 may include a control unit. In some aspects, regulatory device 510 may include a server (e.g., connected to energy equipment 520 via a Controller Area Network (CAN)).

Energy equipment 520 includes one or more devices capable of receiving, generating, storing, processing, and/or providing information associated with manufacturing and/or extracting energy from a NAT-EGS described herein. For example, energy equipment 520 may include a borehole drilling system, a pumping system, an energy capture unit and/or energy conversion unit (e.g., a heat exchanger, a power generation device, a turbine, and/or the like), and/or the like.

User device 530 includes one or more devices capable of receiving, generating, storing, processing, and/or providing information associated with monitoring, configuring and/or designing a NAT-EGS described herein. For example, user device 530 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Network 540 includes one or more wired and/or wireless networks. For example, network 540 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a controller area network (CAN), or the like, and/or a combination of these or other types of networks The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
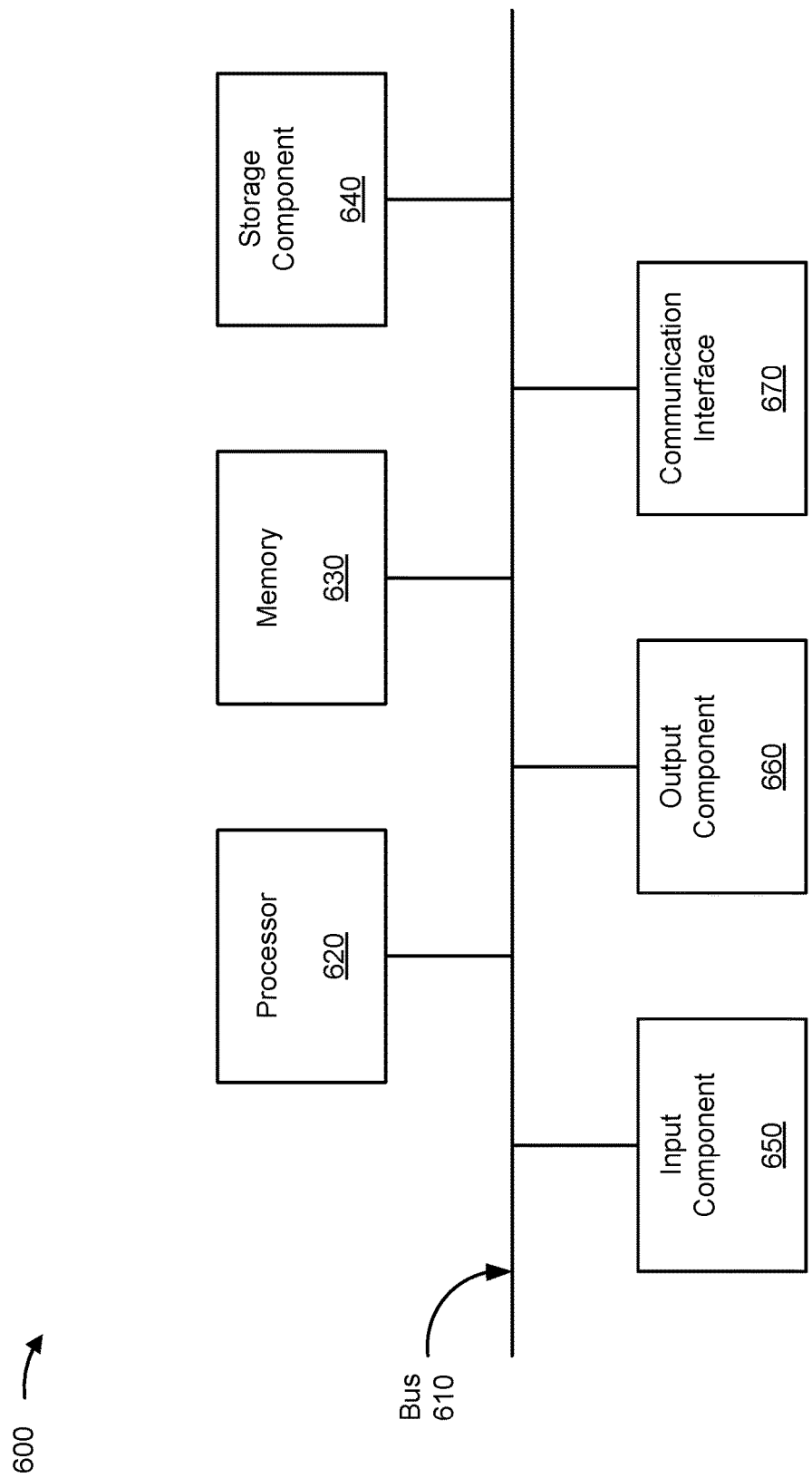
FIG. 6 is a diagram of example components of one or more devices of FIG. 5.

FIG. 6 is a diagram of example components of a device 600. Device 600 may correspond to regulatory device 510, energy equipment 520, and/or user device 530. In some implementations, regulatory device 510, energy equipment 520, and/or user device 530 may include one or more devices 600 and/or one or more components of device 600. As shown in FIG. 6, device 600 may include a bus 610, a processor 620, a memory 630, a storage component 640, an input component 650, an output component 660, and a communication interface 670.

Bus 610 includes a component that permits communication among multiple components of device 600. Processor 620 is implemented in hardware, firmware, and/or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 includes a component that provides output information from device 600 (via, e.g., a display, a speaker, a haptic feedback component, an audio or visual indicator, and/or the like).

Communication interface 670 includes a transceiver-like component (e.g., a transceiver, a separate receiver, a separate transmitter, and/or the like) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, and/or the like.

Device 600 may perform one or more processes described herein. Device 600 may perform these processes based on processor 620 executing software instructions stored by a non-transitory computer-readable medium, such as memory 630 and/or storage component 640. As used herein, the term "computer-readable medium" refers to a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like. Some implementations are described herein to include a parallel relationship or a perpendicular relationship. As used herein, "parallel" is meant to cover substantially parallel, and "perpendicular" is meant to cover substantially perpendicular. Further, as used herein, "substantially" refers to a described measurement, element, or relationship being within a tolerance (e.g., a design tolerance, a manufacturing tolerance, an industry standard tolerance, and/or the like).

Figure 7:
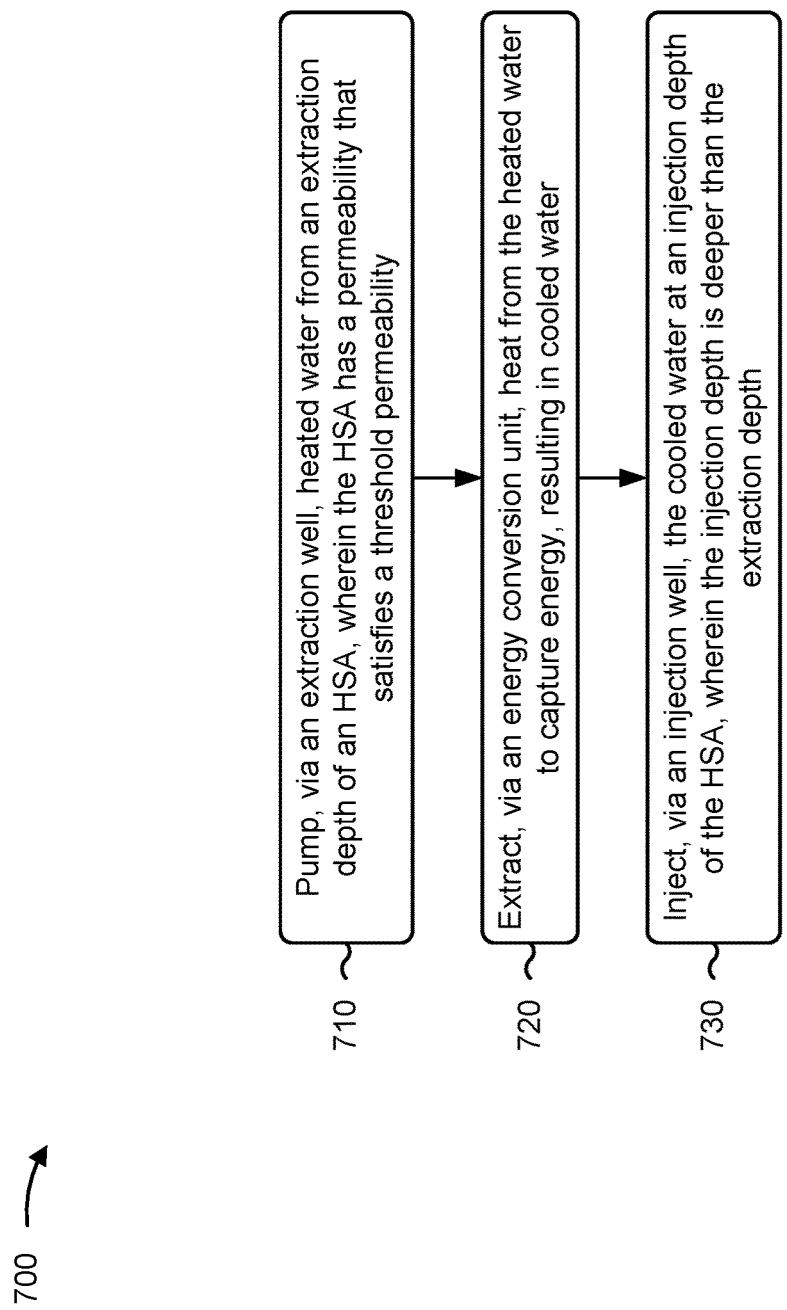
FIGS. 7 and 8 are flowcharts of one or more example processes associated with a Natural Enhanced Geothermal system (NAT-EGS) that uses a hot sedimentary aquifer, as described herein.

FIG. 7 is a flowchart of an example process 700 for a natural enhanced geothermal system using a hot sedimentary aquifer. In some implementations, one or more process blocks of FIG. 7 may be performed by a user device (e.g., user device 530). In some implementations, one or more process blocks of FIG. 7 may be performed by another device or a group of devices separate from or including the user device, such as a regulatory device (e.g., regulatory device 510), energy equipment (e.g., energy equipment 520), and/or the like. Additionally, or alternatively, one or more process blocks of FIG. 7 may be performed by one or more components of a device 600, such as processor 620, memory 630, storage component 640, input component 650, output component 660, communication interface 670, and/or the like.

As shown in FIG. 7, process 700 may include pumping, via an extraction well, heated water from an extraction depth of an HSA, wherein the HSA has a permeability that satisfies a threshold permeability associated with pumping the heated water via the extraction well (block 710). For example, the user device may pump, via an extraction well, heated water from an extraction depth of an HSA, as described above. In some implementations, the HSA has a permeability that satisfies a threshold permeability associated with pumping the heated water via the extraction well.

As further shown in FIG. 7, process 700 may include extracting, via an energy conversion unit, heat from the heated water to capture energy, resulting in cooled water (block 720). For example, the user device may extract, via an energy conversion unit, heat from the heated water to capture energy, resulting in cooled water, as described above.

As further shown in FIG. 7, process 700 may include injecting, via an injection well, the cooled water at an injection depth of the HSA, wherein the injection depth is deeper than the extraction depth (block 730). For example, the user device may inject, via an injection well, the cooled water at an injection depth of the HSA, as described above. In some implementations, the injection depth is deeper than the extraction depth.

Process 700 may include additional implementations, such as any single implementation or any combination of implementations described below and/or in connection with one or more other processes described elsewhere herein.

In a first implementation, the permeability is determined according to an analysis of historical data associated with the HSA. In a second implementation, alone or in combination with the first implementation, the HSA further has a basal heat flow that satisfies a minimum basal heat flow into the HSA that provides the heat.

In a third implementation, alone or in combination with one or more of the first and second implementations, process 700 includes, prior to pumping the heated water, increasing a previous permeability of the HSA to cause the HSA to have the permeability that satisfies the threshold permeability by: drilling a construction lateral between an extraction lateral of the extraction well at the extraction depth and an injection lateral of the injection well at the injection depth; and performing an enhancement operation via the construction lateral to increase the previous permeability of the HSA. In a fourth implementation, alone or in combination with one or more of the first through third implementations, the enhancement operation comprises at least one of: igniting a fuel the construction lateral to increase the previous permeability, supplying acidic water into the construction lateral to increase the previous permeability, or supplying pressurized water into the construction lateral to increase the previous permeability.

In a fifth implementation, alone or in combination with one or more of the first through fourth implementations, the extraction well includes: a production element that extends between the extraction depth and the energy conversion unit, and an extraction lateral, mechanically coupled to the production element, that includes one or more lateral production branches that extend from the production element at the extraction depth. In a sixth implementation, alone or in combination with one or more of the first through fifth implementations, the injection well includes: an injection element that extends between the injection depth and the energy conversion unit, and an injection lateral, mechanically coupled to the injection element, that includes one or more lateral injection branches that extend from the injection element at the injection depth.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
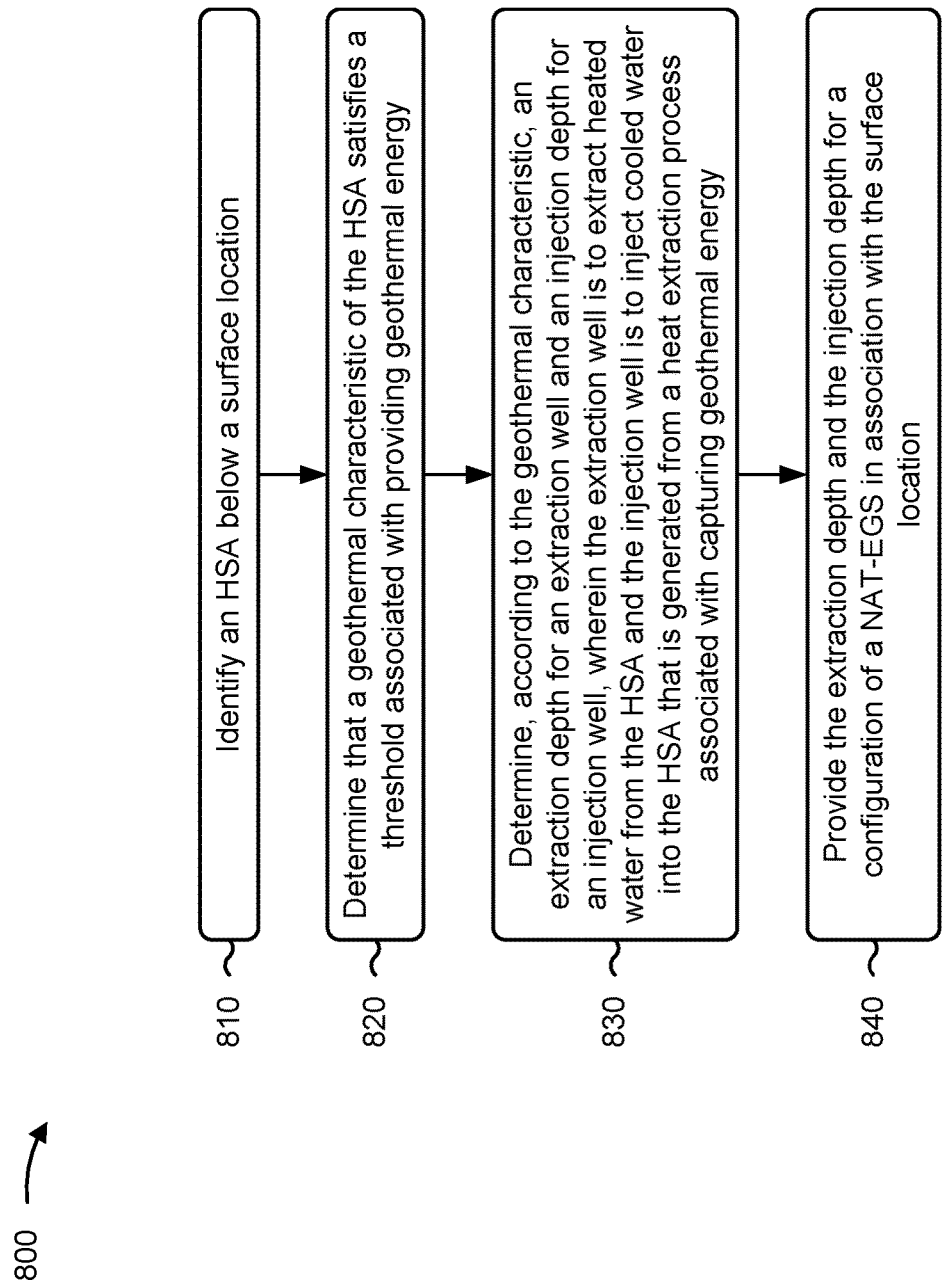

FIG. 8 is a flowchart of an example process 800 for natural enhanced geothermal system using a hot sedimentary aquifer. In some implementations, one or more process blocks of FIG. 8 may be performed by a user device (e.g., user device 530). In some implementations, one or more process blocks of FIG. 8 may be performed by another device or a group of devices separate from or including the user device, such as a regulatory device (e.g., regulatory device 510), energy equipment (e.g., energy equipment 520), and/or the like. Additionally, or alternatively, one or more process blocks of FIG. 8 may be performed by one or more components of a device 600, such as processor 620, memory 630, storage component 640, input component 650, output component 660, communication interface 670, and/or the like.

As shown in FIG. 8, process 800 may include identifying an HSA below a surface location (block 810). For example, the user device may identify an HSA below a surface location, as described above.

As further shown in FIG. 8, process 800 may include determining that a geothermal characteristic of the HSA satisfies a threshold associated with providing geothermal energy (block 820). For example, the user device may determine that a geothermal characteristic of the HSA satisfies a threshold associated with providing geothermal energy, as described above.

As further shown in FIG. 8, process 800 may include determining, according to the geothermal characteristic, an extraction depth for an extraction well and an injection depth for an injection well, wherein the extraction well is to extract heated water from the HSA and the injection well is to inject cooled water into the HSA that is generated from a heat extraction process associated with capturing geothermal energy (block 830). For example, the user device may determine, according to the geothermal characteristic, an extraction depth for an extraction well and an injection depth for an injection well, as described above. In some implementations, the extraction well is to extract heated water from the HSA and the injection well is to inject cooled water into the HSA that is generated from a heat extraction process associated with capturing geothermal energy.

As further shown in FIG. 8, process 800 may include providing the extraction depth and the injection depth for a configuration of a NAT-EGS in association with the surface location (block 840). For example, the user device may provide the extraction depth and the injection depth for a configuration of the NAT-EGS in association with the surface location, as described above.

Process 800 may include additional implementations, such as any single implementation or any combination of implementations described below and/or in connection with one or more other processes described elsewhere herein.

In a first implementation, determining that the geothermal characteristic satisfies the threshold may include determining that a heat flow from the injection depth to the extraction depth satisfies a heat flow threshold associated with providing the geothermal energy. In a second implementation, alone or in combination with the first implementation, the injection depth is deeper than the extraction depth, and a difference between the injection depth and the extraction depth is based on the geothermal characteristic.

In a third implementation, alone or in combination with one or more of the first and second implementations, a difference between the extraction depth and the injection depth is at least 250 meters. In a fourth implementation, alone or in combination with one or more of the first through third implementations, the injection depth is constrained to be at least 1500 meters, and the extraction depth is constrained to be at least 1000 meters.

In a fifth implementation, alone or in combination with one or more of the first through fourth implementations, the geothermal characteristic of the HSA is determined to satisfy the threshold when a temperature of the HSA at the extraction depth is at least 120° C.

In a sixth implementation, alone or in combination with one or more of the first through fifth implementations, process 800 includes determining a flow characteristic of the HSA; determining, based on the extraction depth, the injection depth, and the flow characteristic, a water flow rate associated with extracting the heated water via the extraction well or injecting the cooled water via the injection well; and providing the water flow rate for the configuration of the NAT-EGS.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   pumping, via an extraction well, heated water from an extraction depth of a hot sedimentary aquifer (HSA), wherein the HSA has a permeability that satisfies a threshold permeability associated with pumping the heated water via the extraction well;
   extracting, via an energy conversion unit, heat from the heated water to capture energy, resulting in cooled water; and
   injecting, via an injection well, the cooled water at an injection depth of the HSA,
      wherein the injection depth is deeper than the extraction depth.

2. The method of claim 1, wherein the permeability that satisfies the threshold permeability is determined according to an analysis of historical data associated with the HSA.

3. The method of claim 1, wherein the HSA further has a basal heat flow that satisfies a minimum basal heat flow into the HSA that provides the heat.

4. The method of claim 1, further comprising:
   prior to pumping the heated water, increasing a previous permeability of the HSA to cause the HSA to have the permeability that satisfies the threshold permeability by:
   drilling a construction lateral between an extraction lateral of the extraction well at the extraction depth and an injection lateral of the injection well at the injection depth; and
   performing an enhancement operation via the construction lateral to increase the previous permeability of the HSA.

5. The method of claim 4, wherein the enhancement operation comprises at least one of:
   igniting a fuel in the construction lateral to increase the previous permeability, supplying acidic water into the construction lateral to increase the previous permeability, or supplying pressurized water into the construction lateral to increase the previous permeability.

6. The method of claim 1, wherein the extraction well includes:

a production element that extends between the extraction depth and the energy conversion unit; and an extraction lateral, mechanically coupled to the production element, the extraction lateral includes one or more lateral production branches that extend from the production element at the extraction depth.

7. The method of claim 1, wherein the injection well includes:

an injection element that extends between the injection depth and the energy conversion unit; and an injection lateral, mechanically coupled to the injection element, the injection lateral includes one or more lateral injection branches that extend from the injection element at the injection depth.

8. A method associated with configuring a natural enhanced geothermal system (NAT-EGS), the method comprising:

identifying a hot sedimentary aquifer (HSA) below a surface location;

determining that a geothermal characteristic of the HSA satisfies a threshold associated with providing geothermal energy;

determining, according to the geothermal characteristic, an extraction depth for an extraction well and an injection depth for an injection well, wherein the extraction well is to extract heated water from the HSA and the injection well is to inject cooled water into the HSA that is generated from a heat extraction process associated with capturing geothermal energy; and providing the extraction depth and the injection depth for a configuration of the NAT-EGS in association with the surface location.

9. The method of claim 8, wherein the determining that the geothermal characteristic satisfies the threshold comprises:

determining that a heat flow from the injection depth to the extraction depth satisfies a heat flow threshold associated with providing the geothermal energy.

10. The method of claim 8, wherein the injection depth is deeper than the extraction depth, and a difference between the injection depth and the extraction depth is based on the geothermal characteristic.

11. The method of claim 8, wherein a difference between the extraction depth and the injection depth is at least 200 meters.

12. The method of claim 8, wherein the injection depth is constrained to be at least 1500 meters, and wherein the extraction depth is constrained to be at least 1000 meters.

13. The method of claim 8, wherein the geothermal characteristic of the HSA is determined to satisfy the threshold when a temperature of the HSA at the extraction depth is at least 120 degrees Celsius.

14. The method of claim 8, further comprising:

determining a flow characteristic of the HSA;

determining, based on the extraction depth, the injection depth, and the flow characteristic, a water flow rate associated with extracting the heated water via the extraction well or injecting the cooled water via the injection well; and providing the water flow rate for the configuration of the NAT-EGS.

15. A natural enhanced geothermal system (NAT-EGS) comprising:

an energy capture unit;

a pump system;

a disjointed well system within a hot sedimentary aquifer (HSA), wherein the disjointed well system includes:

an extraction well that enables the pump system to provide heated water at an extraction depth of the HSA to the energy capture unit, and an injection well that enables the pump system to inject cooled water from the energy capture unit into the HSA at an injection depth that is deeper than the extraction depth, wherein a difference between the extraction depth and the injection depth is based on a geothermal characteristic of the HSA; and a regulatory device to:

cause the pump system to pump the heated water, from the extraction well, to the energy capture unit;

cause the energy capture unit to extract thermal energy from the heated water; and cause the pump system to pump the cooled water from the energy capture unit to the injection well, wherein the cooled water results from the thermal energy being extracted from the heated water.

16. The NAT-EGS of claim 15, wherein the regulatory device, when causing the pump system to pump the cooled water, is configured to:

cause the pump system to injected the cooled water with a supplemental fluid to enhance a permeability of the HSA or a porosity of the HSA.

17. The NAT-EGS of claim 15, wherein the geothermal characteristic comprises at least one of:

a heat flow of the HSA between the extraction depth and the injection depth, a permeability of the HSA between the extraction depth and the injection depth, or a porosity of the HSA between the extraction depth and the injection depth.

18. The NAT-EGS of claim 15, wherein the extraction well includes a production element and an extraction lateral, and wherein the injection well includes an injection element and an injection lateral, wherein the production element and the injection element are parallel, and wherein an extraction plane of the extraction lateral and an injection plane of the injection lateral are parallel.

19. The NAT-EGS of claim 18, wherein the injection lateral includes a plurality of lateral injection branches within the injection plane, and the extraction lateral includes a plurality of lateral production branches within the extraction plane.

20. The NAT-EGS of claim 19, wherein the plurality of lateral injection branches are correspondingly aligned with the plurality of lateral production branches to form a plurality of vertical heat flow zones within the HSA and between the injection lateral and the extraction lateral.

* * * * *